(12) United States Patent
Oono

(10) Patent No.: US 10,150,238 B2
(45) Date of Patent: Dec. 11, 2018

(54) INJECTION MOLDING MACHINE CONTROLLING DRIVE OF MOVABLE PART WITH MOTOR

(71) Applicant: FANUC Corporation, Minamitsuru-gun, Yamanashi (JP)

(72) Inventor: Hajime Oono, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 226 days.

(21) Appl. No.: 15/146,028

(22) Filed: May 4, 2016

(65) Prior Publication Data

US 2016/0332351 A1    Nov. 17, 2016

(30) Foreign Application Priority Data

May 12, 2015    (JP) .................. 2015-097423

(51) Int. Cl.
  *B29C 45/80* (2006.01)
  *B29C 45/76* (2006.01)

(52) U.S. Cl.
  CPC .. *B29C 45/7666* (2013.01); *B29C 2945/7611* (2013.01); *B29C 2945/7623* (2013.01); *B29C 2945/76083* (2013.01); *B29C 2945/76214* (2013.01); *B29C 2945/76247* (2013.01); *B29C 2945/76515* (2013.01); *B29C 2945/76595* (2013.01); *B29C 2945/76692* (2013.01);
  (Continued)

(58) Field of Classification Search
  CPC ......... B29C 45/7666; B29C 2945/7611; B29C 2945/46083; B29C 2945/76214; B29C 2945/2945; B29C 2945/7623; B29C 2945/76247; B29C 2945/76515; B29C 2945/76692; B29C 2945/76595; B29C 2945/76709; B29C 2945/76725; B29C 2945/76943
  USPC ........................................ 425/162
  See application file for complete search history.

(56) References Cited

U.S. PATENT DOCUMENTS

| 5,445,773 A | * | 8/1995 | Arai ...................... B29C 45/768 264/40.1 |
| 5,869,108 A | * | 2/1999 | Hiraoka ............. B29C 45/5008 264/40.7 |

(Continued)

FOREIGN PATENT DOCUMENTS

| JP | H04-334429 A | 11/1992 |
| JP | H06-31499 A | 2/1994 |

(Continued)

OTHER PUBLICATIONS

Decision to Grant a Patent dated Aug. 22, 2017 in Japanese Patent Application No. 2015-097423 (3 pages) with an English translation (3 pages).

*Primary Examiner* — Yogendra N Gupta
*Assistant Examiner* — Emmanuel S Luk
(74) *Attorney, Agent, or Firm* — Drinker Biddle & Reath LLP

(57) ABSTRACT

In an injection molding machine, a predetermined torque limit value set in advance and acceleration/deceleration torque calculated by an acceleration/deceleration torque calculation section are added to set an output torque limit value for a motor. By this operation, quick acceleration or deceleration can be achieved in an injection process, and breakage of a mold and mechanism section of the injection molding machine can be prevented.

1 Claim, 4 Drawing Sheets

(52) U.S. Cl.
CPC ............... *B29C 2945/76709* (2013.01); *B29C 2945/76725* (2013.01); *B29C 2945/76943* (2013.01)

(56) References Cited

U.S. PATENT DOCUMENTS

| | | | |
|---|---|---|---|
| 5,911,924 A * | 6/1999 | Siegrist | B29C 45/5008 264/328.1 |
| 6,089,849 A * | 7/2000 | Bulgrin | B29C 45/76 264/40.7 |
| 6,211,636 B1 | 4/2001 | Matsubara et al. | |
| 2003/0062643 A1* | 4/2003 | Bulgrin | B29C 45/76 264/40.1 |
| 2003/0160345 A1* | 8/2003 | Liu | B29C 45/77 264/40.5 |
| 2005/0053685 A1* | 3/2005 | Nagaya | B29C 45/1777 425/149 |
| 2006/0145379 A1* | 7/2006 | Okazaki | B29C 45/77 264/40.1 |
| 2007/0071845 A1* | 3/2007 | Tsuji | B22D 17/266 425/450.1 |
| 2009/0065962 A1* | 3/2009 | Budde | B29C 45/77 264/40.3 |
| 2010/0112113 A1* | 5/2010 | Tobita | B22D 17/263 425/150 |
| 2013/0033220 A1* | 2/2013 | Ueda | B29C 45/77 318/689 |

FOREIGN PATENT DOCUMENTS

| | | |
|---|---|---|
| JP | H06-246801 A | 9/1994 |
| JP | H09-254220 A | 9/1997 |
| JP | H10-210788 A | 8/1998 |
| JP | H10-249597 A | 9/1998 |
| JP | 2007-14998 A | 1/2007 |

* cited by examiner

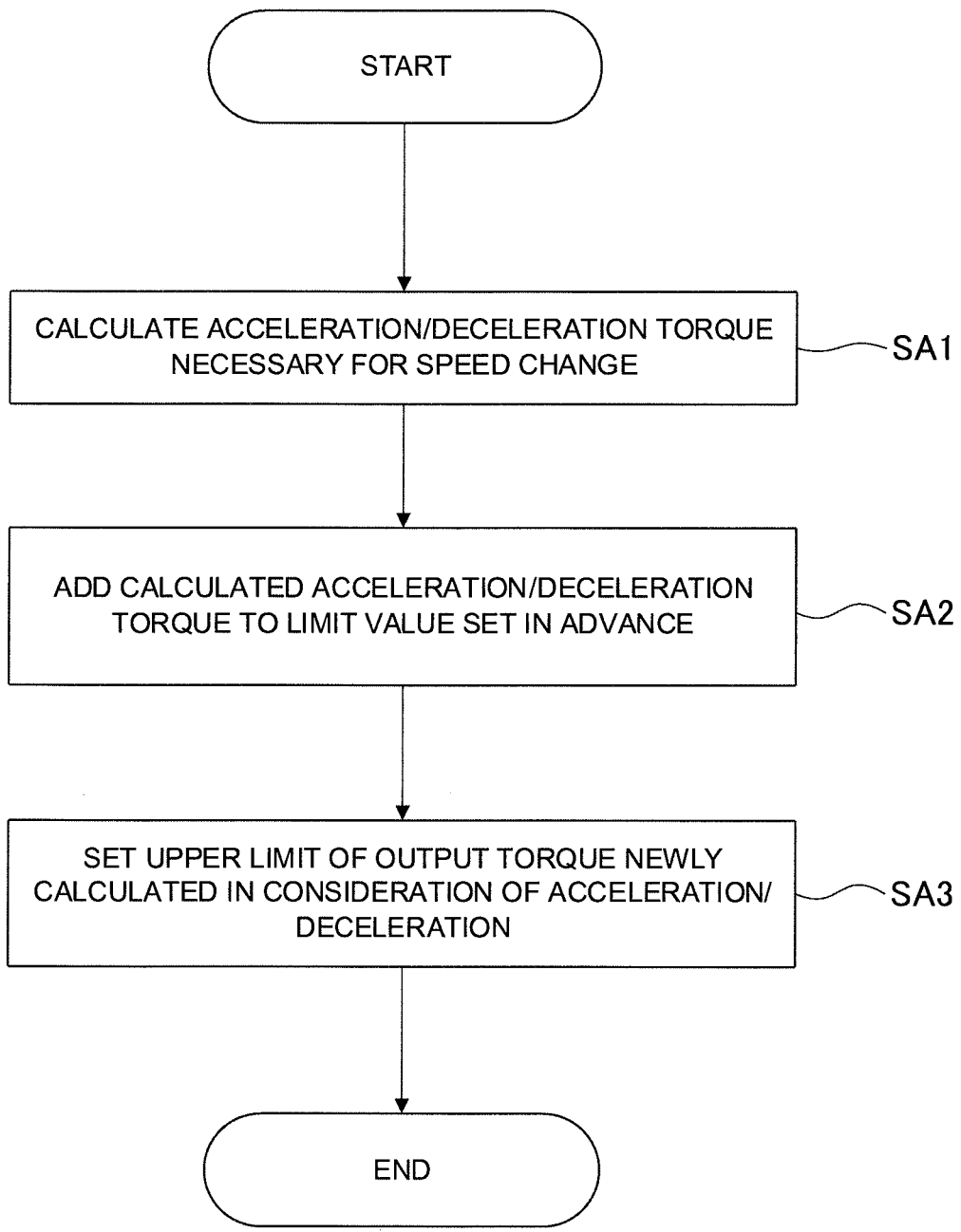

INJECTION MOLDING MACHINE CONTROLLING DRIVE OF MOVABLE PART WITH MOTOR

RELATED APPLICATION DATA

This application claims priority under 35 U.S.C. § 119 and/or § 365 to Japanese Application No. 2015-097423 filed May 12, 2015, the entire contents is incorporated herein by reference.

BACKGROUND OF THE INVENTION

1. Field of the Invention

The present invention relates to an injection molding machine, and more particularly, relates to an injection molding machine that controls drive of a movable part with a motor.

2. Description of the Related Art

An injection molding machine is provided with many motors. These motors include an injection motor for injection operation in the injection machine, a screw rotation motor for rotating a screw for sending resin in the injection machine, a mold opening/closing motor for opening, closing, and clamping a mold, and an ejection motor for ejecting a molded article. To increase the quality of the molded article in the injection molding machine, it is important to perform feedback control of the control conditions of the injection speed and injection pressure. For the feedback control, the speed of each motor is to be controlled.

Generally, when the same torque is applied, a servomotor used in the injection molding machine has a higher duty as the capacity of the motor increases. If the high duty motor is used, maximum torque of the motor may exceed an allowable value of the mechanism section of the injection molding machine body. In such a case, the mechanism section of the injection molding machine body may be affected. To solve the problem, an upper limit (torque limit) is set to the motor output torque to protect the mold and the mechanism section of the injection molding machine.

If the motor rotates at a constant speed, or the motor rotation speed is almost zero and only torque is produced, the load applied to the mechanism section is expressed in a relationship of a linear function of the torque output by the motor, and limited to a constant value by a torque limit. However, by the method of setting the torque limit of the constant value, the limit is inevitably set despite the need of torque at acceleration or deceleration, and in some cases, the motor has to operate with slow acceleration or deceleration.

Japanese Unexamined Patent Application Publication No. 6-246801 discloses a method of driving an injection screw with a servo motor to move the screw forward for injection. The injection molding machine includes a torque limiting means that can control the torque of the servo motor. In an adjustable speed area, during primary injection processing, the torque limit for the servo motor by the torque limiting means is released. In other areas than the adjustable speed area, during the primary injection processing, the torque limit is applied by the torque limiting means.

Japanese Unexamined Patent Application Publication No. 9-254220 discloses a motor-operated injection molding machine that temporarily releases a limitation of the magnitude of the output torque of an injection driver amplifier at start-up of an injection process to reduce the rise time of the injection process to increase the injection molding efficiency.

Japanese Unexamined Patent Application Publication No. 4-334429 discloses a method of starting a screw of an injection molding machine by limiting torque to initial torque that is smaller than torque (normal torque) in a steady state and then sequentially increasing the output torque from the initial torque to the normal torque to prevent an impact at the start-up of the screw to smoothly and stably start the screw to effectively prevent breakage of the screw.

According to the known methods of setting a torque limit of a constant value, however, the limit is set to the torque necessary at the acceleration or deceleration, and in some cases, the machine has to operate with slow acceleration or deceleration.

In the techniques disclosed in Japanese Unexamined Patent Application Publication No. 6-246801 and Japanese Unexamined Patent Application Publication No. 9-254220, the limitation of the torque is released at start-up of the injection process, and the like so that appropriate acceleration or deceleration can be provided at the start-up of the injection process and the like. However, since the limitation of the torque is completely released, depending on the value of the acceleration or deceleration, the maximum torque of the motor may exceed the allowable value of the mechanism section of the injection molding machine body. In such a case, the mold and the mechanism section of the injection molding machine may break.

In the technique disclosed in Japanese Unexamined Patent Application Publication No. 4-334429, the torque limitation is performed at the start-up time to prevent breakage of the screw. Accordingly, the breakage of the screw can be prevented, however, the acceleration or deceleration speed may be decreased more than the case of setting the torque limit of the constant value.

SUMMARY OF THE INVENTION

An object of the present invention is to provide an injection molding machine capable of performing quick acceleration or deceleration while preventing breakage of a mold and mechanism section of the injection molding machine.

According to an aspect of the invention, an injection molding machine that controls drive of a movable part with a motor is provided. The injection molding machine includes a speed instruction section for issuing an instruction of a speed and an acceleration of the movable part, an acceleration/deceleration torque calculation section for calculating torque necessary for the change of the speed instructed by the speed instruction section, and an output torque limit setting section for setting an output torque limit for the motor. The output torque limit setting section adds a predetermined torque limit value set in advance and the acceleration/deceleration torque calculated by the acceleration/deceleration torque calculation section to set an output torque limit value for the motor each time the value of the acceleration instructed by the speed instruction section changes.

According to another aspect of the invention, a method for controlling an injection molding machine that controls drive of a movable part with a motor is provided. The injection molding machine includes a speed instruction section for issuing an instruction of a speed and an acceleration of the movable part and an output torque limit setting section for setting an output torque limit for the motor. The method includes calculating torque necessary for the change of the speed instructed by the speed instruction section each time the value of the acceleration instructed by the speed instruction section changes, and adding a predetermined torque limit value set in advance and the calculated acceleration/deceleration torque to set an output torque limit value for the motor.

In acceleration or deceleration such as start-up of an injection step, a torque limit value is loosened by an amount necessary for the acceleration or deceleration while a predetermined torque limit value for normal state is provided. The acceleration/deceleration components applied to the mechanism section at the acceleration or deceleration in the injection process does not become a load to the mechanism section even if the output torque of the motor is increased. To loosen the torque limit value, quick acceleration or deceleration can be performed in the injection process but the torque limitation is not completely released. Accordingly, breakage of a mold and the mechanism section of the injection molding machine can be prevented. Moreover, the torque limit value calculation is performed each time the value of the acceleration changes. Consequently, an optimum output torque limit value for the motor can be set each time the value of the acceleration or deceleration changes.

According to the aspects of the invention, an injection molding machine capable of performing quick acceleration or deceleration and achieving protection of the mechanism section of the injection molding machine can be provided.

BRIEF DESCRIPTION OF THE DRAWINGS

FIG. 3 is a flowchart showing operation according to the embodiment.

DETAILED DESCRIPTION OF THE PREFERRED EMBODIMENTS

Figure 1:
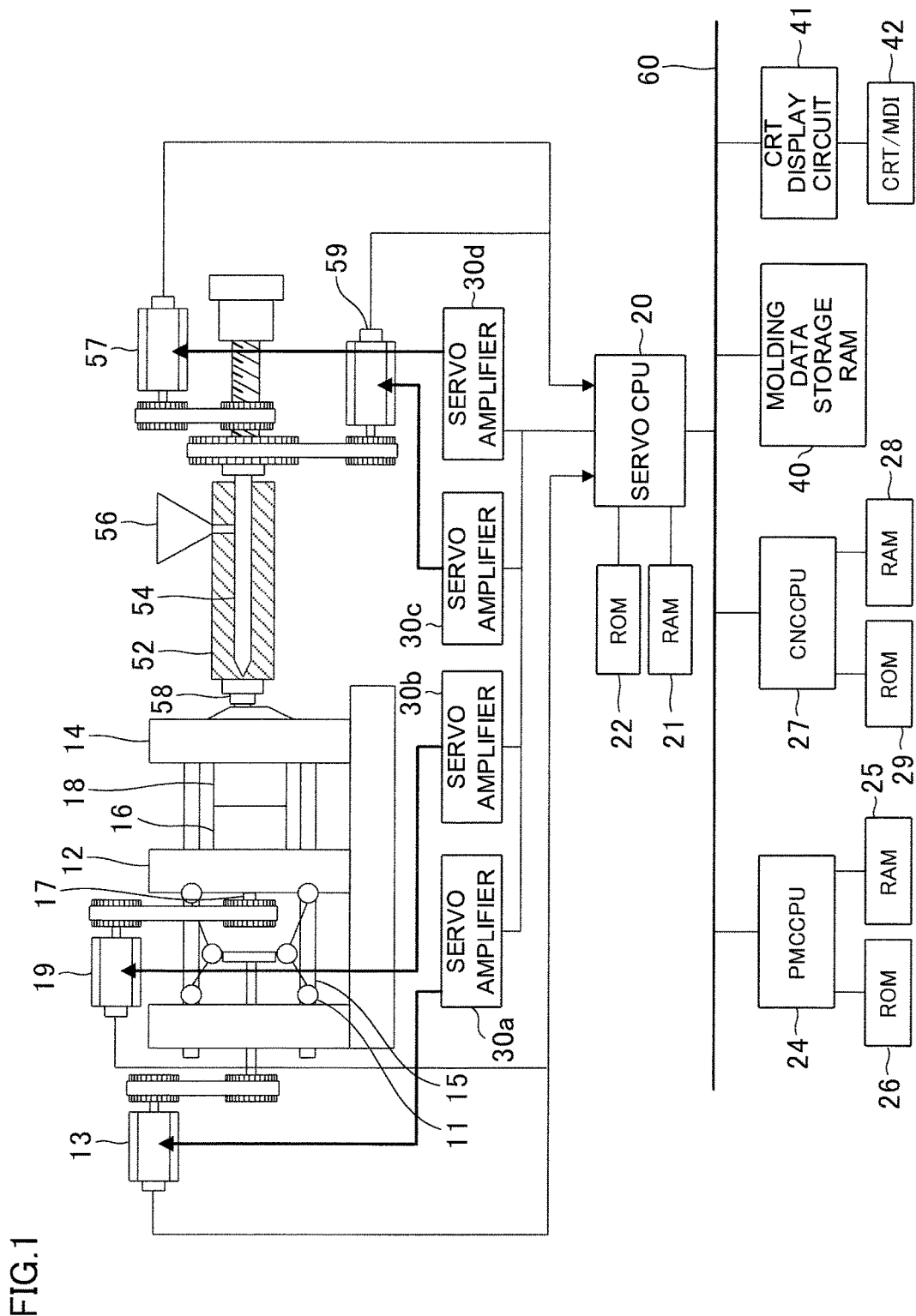
FIG. 1 is a block diagram showing an overall structure of an injection molding machine according to an embodiment of the present invention.

FIG. 1 is a block diagram showing an overall structure of an injection molding machine according to an embodiment. The injection molding machine includes an injection device and a clamping device. The clamping device includes a movable platen 12 and a fixed platen 14. The movable platen 12 and the fixed platen 14 are connected with a tie bar 15. The movable platen 12 can move along the tie bar 15 in a direction approaching the fixed platen 14 and in a direction separating from the fixed platen by driving a crosshead 11 with a toggle mechanism. On the movable platen 12, a movable side mold 16 is mounted, and on the fixed platen 14, a fixed side mold 18 is mounted.

The crosshead 11 is operated by the rotation of a mold opening/closing motor 13, and thereby the movable platen 12 is moved along the tie bar 15. After the movable side mold 16 and the fixed side mold 18 come in contact with each other, the rotation of the mold opening/closing motor 13 is further continued for clamping.

After the clamping operation, the molded article is ejected by rotating an ejection motor 19 to drive an ejector (ejection device) 17.

The injection device includes a cylinder 52, a hopper 56 that supplies resin to the cylinder 52, a screw 54 that sends the resin while agitating the resin in the cylinder 52, and a nozzle 58 provided at a tip portion of the cylinder 52. The resin is supplied to the cylinder 52 by the rotation of an injection motor 57, the screw 54 is rotated by the rotation of a screw rotation motor 59, and the resin is agitated in the cylinder 52 and sent. The resin stored in the hopper 56 is supplied into the cylinder 52. The resin supplied in the cylinder 52 is agitated and sent by the rotation of the screw 54 while being melted by a heater (not shown) provided near the cylinder 52. The resin is injected from the nozzle 58 into the mold (movable side mold 16, fixed side mold 18).

To each servo motor, an amplifier that drives a corresponding servo motor is connected. As shown in FIG. 1, a servo amplifier 30a controls the mold opening/closing motor 13, a servo amplifier 30b controls the ejection motor 19, a servo amplifier 30c controls the screw rotation motor 59, and a servo amplifier 30d controls the injection motor 57.

To a servo CPU 20, a read-only memory (ROM) 22 that stores a control program dedicated to servo control for performing a position loop, a speed loop, and a current loop, and a random access memory (RAM) 21 that is to be used to temporarily store data are connected. Information such as operating condition of each motor is input to the servo CPU 20.

To a programmable machine controller (PMC) CPU 24, a ROM 26 that stores a sequence program for controlling sequence operation of the injection molding machine and other data, and a RAM 25 that temporarily stores calculation data and the like are connected. To a computer numerical control (CNC) CPU 27, a ROM 29 that stores an automatic operation program for performing overall control of the injection molding machine and other data, and a RAM 28 that is used to temporarily store calculation data and the like are connected.

A cathode ray tube/manual data input (CRT/MDI) 42 that includes a display device such as a liquid crystal display device is connected to a bus 60 via a CRT display circuit 41. A molding data storage RAM 40 that is a nonvolatile memory is also connected to the bus 60. The molding data storage RAM 40 stores molding conditions and various setting values relating to injection molding operation, parameters, macro variables, and the like.

This structure enables the PMC CPU 24 to control the sequence operation of the overall injection molding machine. The CNC CPU 27 distributes movement instructions to individual motors according to the operation program in the ROM 29 and based on the molding conditions stored in the molding data storage RAM 40. The servo CPU 20 performs servo control of conventional position loop control, speed loop control, and further current loop control, the so-called digital servo processing.

Figure 2:
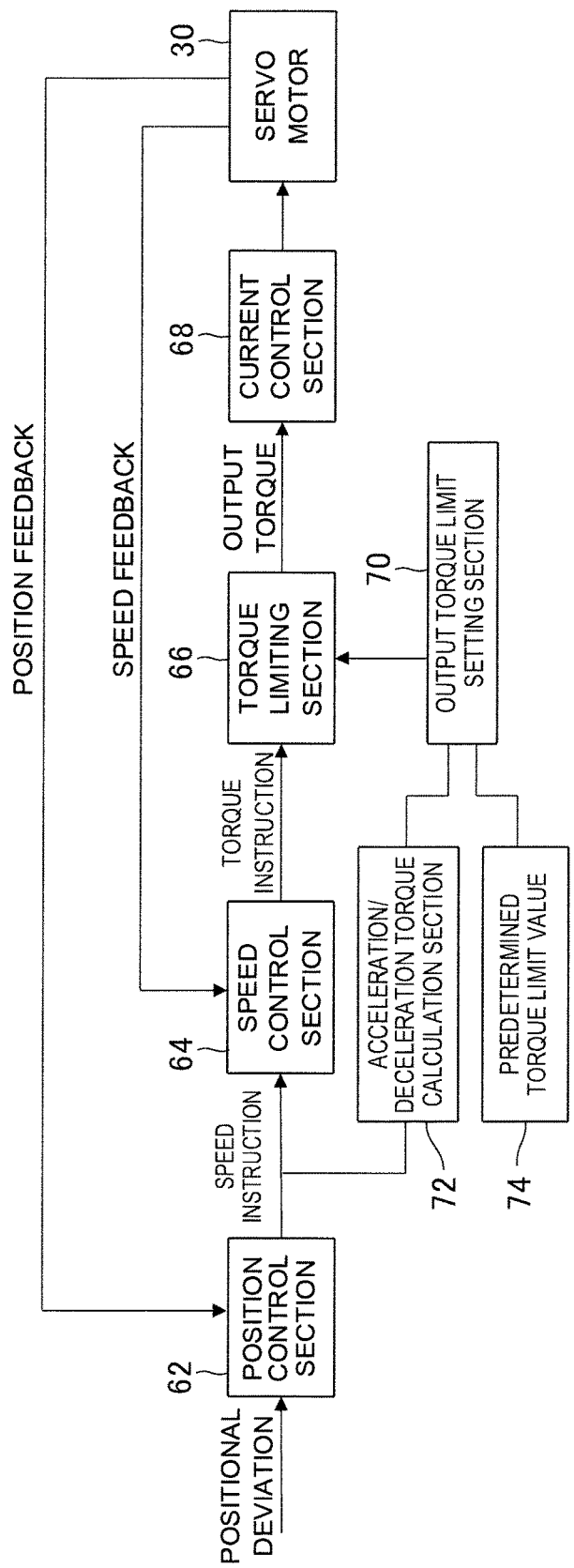
FIG. 2 is a block diagram showing control of operation performed in a servo central processing unit (CPU) according to the embodiment.

FIG. 2 is a block diagram showing the control of the operation performed in the servo CPU 20 according to the embodiment. Positional information and speed information output from a servo motor 30 is input in a position control section 62 and a speed control section 64 respectively. The position control section 62 receives the positional information and positional deviation information from the servo motor 30, and outputs a speed instruction. The output speed instruction is input in the speed control section 64 and an acceleration/deceleration torque calculation section 72. The speed control section 64 outputs a torque instruction to a torque limiting section 66 based on the speed information from the servomotor 30 and the speed instruction from the position control section 62.

The torque limiting section 66 receives the torque instruction from the speed control section 64 and an output torque limit instruction from an output torque limit setting section 70 described below, and limits an output torque to be output to a current control section 68. The current control section 68 controls a value of current to be sent to the servo motor 30 based on the output torque instruction from the torque limiting section 66.

The speed instruction output from the position control section 62 is also input in the acceleration/deceleration torque calculation section 72. The acceleration/deceleration torque calculation section 72 calculates acceleration/deceleration torque at the time of the speed change based on the speed instruction output from the position control section 62. A predetermined torque limit value 74 is stored in the RAM 21 or ROM 22. Both of the acceleration/deceleration torque value output from the acceleration/deceleration torque calculation section 72 and the predetermined torque limit value 74 are input to the output torque limit setting section 70. The output torque limit setting section 70 sets a limit value of the output torque based on the value of the torque input from the acceleration/deceleration torque calculation section 72 and the value of the predetermined torque limit value 74, and outputs the limit value to the torque limiting section 66.

With reference to FIG. 3, the operation according to the embodiment is described step by step.

(Step SA1) Calculate acceleration/deceleration torque necessary for a speed change when the speed is changed.

(Step SA2) Add the acceleration/deceleration torque calculated in step SA1 to a predetermined torque limit value set in advance.

(Step SA3) Set an upper limit value of the output torque value in consideration of the value added in step SA2.

The acceleration/deceleration torque necessary for changing the speed according to the instruction due to the change in the instruction speed of the controller controlling the drive of the motor when there is no disturbance is calculated from a relationship of the expression (1).

$$\text{(Motor output torque)} = \text{(amount of speed change per unit time)} \times \text{(inertia/mechanical efficiency)} \quad (1)$$

For the calculation of inertia, a known calculation method can be employed using a mass of an object, a distance from a rotation center, and the like. The mechanical efficiency can be calculated from a ratio between energy given to the machine and energy necessary for the machine to perform effective work. Parameters unique to the machine necessary for the calculation are obtained by the machine design and a performance evaluation test, and the numeric values are stored in a storage device (RAM 21 or ROM 22) of the control device of the injection molding machine. Then, the predetermined torque limit value 74 stored in the storage device (RAM 21 or ROM 22) is read, to the read predetermined torque limit value 74, the acceleration/deceleration torque calculated by the expression (1) is added, and thereby the value is sequentially set as a new torque upper limit value. As described above, the acceleration/deceleration torque is added and a new torque upper limit is set. The acceleration/deceleration components applied to the mechanism section at the acceleration or deceleration does not become a load to the mechanism section even if the output torque of the motor is increased.

Figure 4A:
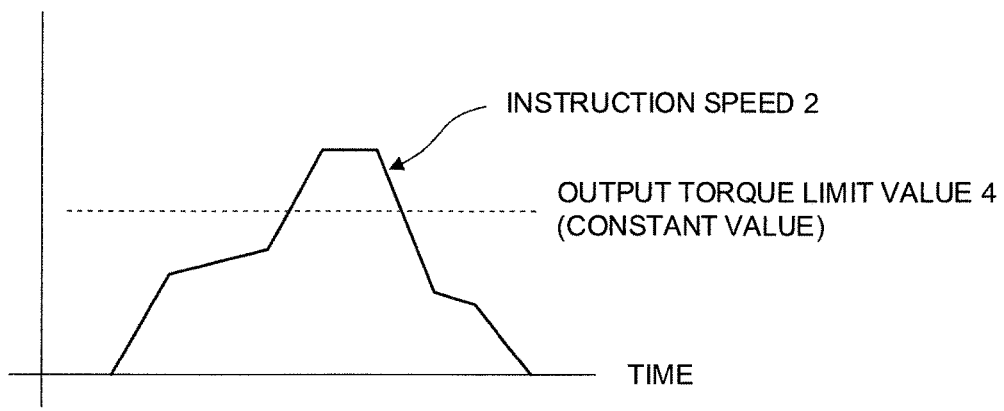
FIG. 4A shows a relationship between an instruction speed and an output torque limit value according to a known art.
Figure 4B:
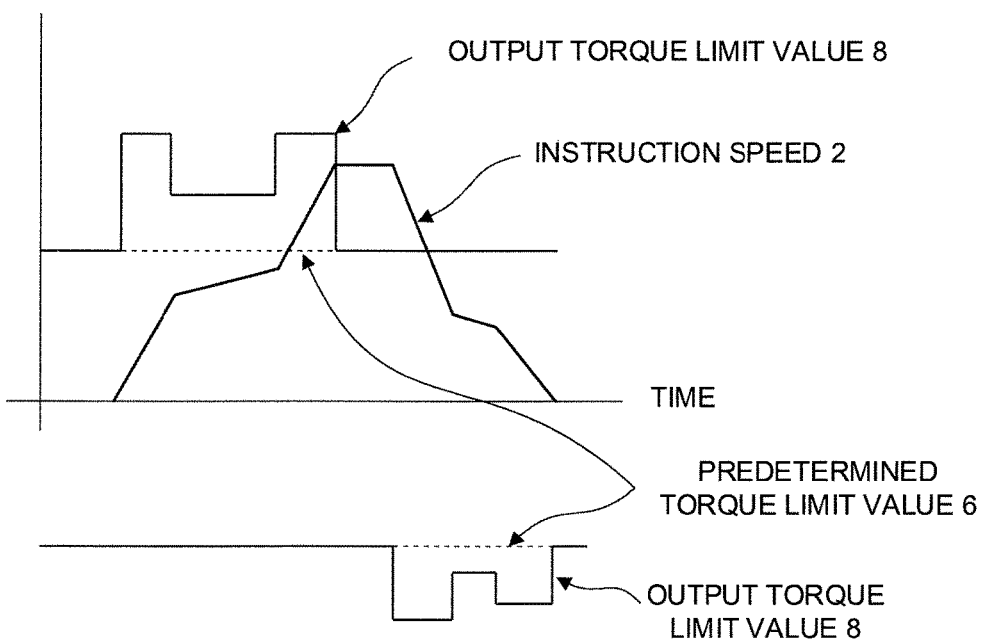
FIG. 4B shows a relationship between an instruction speed and an output torque limit value according to the embodiment.

FIG. 4A and FIG. 4B show relationships between an instruction speed and an output torque limit value. FIG. 4A shows conventional operation, and FIG. 4B shows operation according to the embodiment. In the conventional operation shown in FIG. 4A, the output torque limit value 4 is a constant value. Accordingly, the torque is limited if the output torque exceeds the output torque limit value regardless of operation during acceleration or deceleration, or operation at the constant speed.

On the other hand, according to the embodiment shown in FIG. 4B, during acceleration or deceleration, only the acceleration/deceleration torque necessary for the acceleration or deceleration calculated by the expression (1) is added to the predetermined torque limit value. Consequently, during the acceleration or deceleration, the output torque limit value corresponding to the acceleration or deceleration can be set, and the appropriate output torque limit value can be set.

During deceleration, the acceleration becomes minus, and a minus torque instruction is issued. Consequently, the torque limit value shown in FIG. 4B can be set by adding the minus acceleration/deceleration torque to the predetermined torque limit value during deceleration, that is, by subtracting the absolute value of the acceleration/deceleration torque.

The use of the ejector as the movable part may deteriorate the quality of the molded article due to hardening of the resin caused by decreasing acceleration or deceleration speed if the conventional constant torque limit value is used. In contrast, in the injection molding machine according to the embodiment, a cut pin can be moved forward in a short time, especially in performing gate cutting in the mold. Accordingly, effective cutting can be performed, for example, on a thin molded article of a resin that hardens quickly and is difficult to cut. Moreover, the quick forward movement of the cut pin is effective for the problem of distortion of the cut portion. If the timing of the forward movement of the ejector is merely advanced, due to residual pressure in the resin, the cut pin for the mold is subjected to the force and may be worn.

The injection molding machine according to the embodiment is also effective in compressing the molded article in the mold. It is necessary to perform the compression processing in a short time for thin-walled molded articles or lens molding that requires a high transfer property. If the timing of the forward movement of the ejector is merely advanced, however, the resin is not fully filled into the mold cavity and an unfilled portion may be produced. If it takes time for the compression by the forward movement of the ejector, the resin may harden and this may prevent the compression, or the residual stress in the molded article may increase. The injection molding machine according to the embodiment can solve these problems.

In the case of the use of a screw rotation shaft as the movable part, the productivity increases as the time necessary for each process in the injection molding becomes short. Similarly, it is preferable that the screw rotation speed quickly reaches its set speed in the metering step of accumulating molten resin in the front of the screw while plasticating the resin by the screw rotation. However, during the rotation at the constant speed, in some cases, it is necessary to limit the output torque. For example, in an abnormal state in which a foreign material such as a piece of metal exists in the resin material, the damage to the mechanism section can be lessened if the torque is limited.

Generally, the injection molding machine is designed to correspond to a plurality of screw diameters with one injection design. Accordingly, only the screw and the cylinder can be attached or detached, and injection members of different screw diameters can be attached without changing the drive devices such as the motors. In view of mechanism section protection, if a screw of a small diameter is to be used, it is preferable that an upper limit value of the output torque during the constant speed rotation is set to a smaller value as compared to the case a screw of a large diameter is used. The resin material to be used in the injection molding machine include resin materials of various viscosities, and it is difficult to estimate the load to be a constant amount. According to the embodiment, both of the quick acceleration and deceleration and the protection of the injection molding machine mechanism section can be achieved.

Moreover, general injection molding machines include motor-driven shafts, in addition to the ejector and the screw rotation shaft, such as a mold opening/closing shaft, a screw forward/backward shaft, an injection unit forward/backward shaft, a rear platen forward/backward shaft, and the like, and the mechanism according to the embodiment can be applied to these shafts.

The invention claimed is:

1. An injection molding machine that controls drive of a movable part with a motor, the injection molding machine comprising:
   a speed instruction section for issuing an instruction of a speed and an acceleration of the movable part;
   an acceleration/deceleration torque calculation section for calculating torque necessary for the change of the speed instructed by the speed instruction section; and
   an output torque limit setting section for setting an output torque limit for the motor,
   wherein the output torque limit setting section adds a predetermined torque limit value set in advance and the acceleration/deceleration torque calculated by the acceleration/deceleration torque calculation section to set an output torque limit value for the motor each time the value of the acceleration instructed by the speed instruction section changes.

* * * * *